(12) United States Patent
Johnson et al.

(10) Patent No.: US 12,187,192 B2
(45) Date of Patent: Jan. 7, 2025

(54) VEHICLE LIGHTING SYSTEM AND LIGHTING METHOD

(71) Applicant: Ford Global Technologies, LLC, Dearborn, MI (US)

(72) Inventors: Aaron B. Johnson, Allen Park, MI (US); Luciano Lukacs, Plymouth, MI (US); Michael L. Merritt, Farmington, MI (US); Joshua D. Schwab, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 17/734,274

(22) Filed: May 2, 2022

(65) Prior Publication Data

US 2023/0347813 A1 Nov. 2, 2023

(51) Int. Cl.
*B60Q 1/34* (2006.01)
*B60Q 1/00* (2006.01)
*B60Q 1/26* (2006.01)

(52) U.S. Cl.
CPC ............. *B60Q 1/34* (2013.01); *B60Q 1/0035* (2013.01); *B60Q 1/2619* (2013.01); *B60Q 1/2696* (2013.01)

(58) Field of Classification Search
CPC ................ B60Q 1/24–28; B60Q 1/0035–0047
See application file for complete search history.

(56) References Cited

U.S. PATENT DOCUMENTS

| | | | |
|---|---|---|---|
| 7,108,407 B2 | 9/2006 | Kashiwagi | |
| 8,405,498 B1 * | 3/2013 | Smith | B60Q 1/54 340/471 |
| 9,597,998 B2 * | 3/2017 | Ovenshire | B62D 25/12 |
| 9,889,791 B2 | 2/2018 | Salter et al. | |
| 11,021,095 B2 * | 6/2021 | Spenner | H05B 45/00 |
| 11,077,785 B2 | 8/2021 | Pakiman | |
| 2020/0324684 A1 * | 10/2020 | Pakiman | F21S 41/192 |

FOREIGN PATENT DOCUMENTS

| | | |
|---|---|---|
| CN | 110356315 A | 10/2019 |
| JP | 2009234339 A | 10/2009 |

\* cited by examiner

*Primary Examiner* — Jason M Han
(74) *Attorney, Agent, or Firm* — Vichit Chea; Carlson, Gaskey & Olds, P.C.

(57) ABSTRACT

A vehicle lighting system includes a lighting assembly that is disposed along an interface between a hood of a vehicle and a fender of the vehicle. A vehicle lighting method includes securing a lighting assembly at a position between a fender and a hood of a vehicle. The lighting assembly extends along a vertically upper end of the fender. The method further includes emitting light from the lighting assembly.

18 Claims, 3 Drawing Sheets

VEHICLE LIGHTING SYSTEM AND LIGHTING METHOD

TECHNICAL FIELD

This disclosure relates generally to a lighting system for a vehicle and, more particularly, to a fender lighting system that emits light along a length of the fender.

BACKGROUND

Vehicles can include various types of lighting assemblies. The lighting assemblies can be, for example, headlamps, tail lamps, side markers, decorative, or some combination of these. Lighting assemblies can illuminate for aesthetic purposes, to provide indicators, to illuminate desired areas, etc.

SUMMARY

In some aspects, the techniques described herein relate to a vehicle lighting system, including: a lighting assembly that is disposed along an interface between a hood of a vehicle and a fender of the vehicle.

In some aspects, the techniques described herein relate to a lighting assembly, further including the fender, the lighting assembly mounted to the fender.

In some aspects, the techniques described herein relate to a vehicle lighting system, wherein the lighting assembly is mounted adjacent a vertically upper edge of the fender.

In some aspects, the techniques described herein relate to a vehicle lighting system, wherein the lighting assembly is mounted to a catwalk of the fender, the catwalk facing vertically upward.

In some aspects, the techniques described herein relate to a vehicle lighting system, wherein a longitudinal length of the lighting assembly is greater than a length of the vertically upper edge.

In some aspects, the techniques described herein relate to a vehicle lighting system, wherein the lighting assembly extends from a leading edge of the fender to a trailing edge of the fender.

In some aspects, the techniques described herein relate to a vehicle lighting system, wherein the fender is a front fender.

In some aspects, the techniques described herein relate to a vehicle lighting system, wherein the fender establishes at least a portion of a wheel well.

In some aspects, the techniques described herein relate to a lighting assembly, wherein the lighting assembly extends from a position aft the wheel well to a position forward the wheel well.

In some aspects, the techniques described herein relate to a vehicle lighting system, wherein the lighting assembly includes a light source having an LED strip.

In some aspects, the techniques described herein relate to a vehicle lighting system, wherein the lighting assembly includes a light source having ultra-violet charging LED strips.

In some aspects, the techniques described herein relate to a vehicle lighting system, wherein no portion of the fender extends vertically above the fender.

In some aspects, the techniques described herein relate to a lighting assembly, wherein a forward end of the lighting assembly interfaces with a headlamp of the vehicle.

In some aspects, the techniques described herein relate to a vehicle lighting method, including: securing a lighting assembly at a position between a fender and a hood of a vehicle, the lighting assembly extending along a vertically upper end of the fender; and emitting light from the lighting assembly.

In some aspects, the techniques described herein relate to a vehicle lighting method, wherein the lighting assembly extends from a trailing edge of the fender to a leading edge of the fender.

In some aspects, the techniques described herein relate to a vehicle lighting method, wherein the lighting assembly extends to a position where the lighting assembly interfaces with a headlamp of the vehicle.

In some aspects, the techniques described herein relate to a vehicle lighting method, wherein the lighting assembly extends from a position aft a wheel well to a position forward the vehicle, the fender providing the wheel well.

In some aspects, the techniques described herein relate to a vehicle lighting method, further including blinking the light to provide a turn indicator.

In some aspects, the techniques described herein relate to a vehicle lighting method, further including emitting light in different colors from the lighting assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary lighting systems and lighting methods associated with a fender area of a vehicle. The lighting systems and lighting methods can emit light along an entire length of the fender. The lighting systems and lighting methods can aesthetically enhance the vehicle, among other things.

Figure 1:
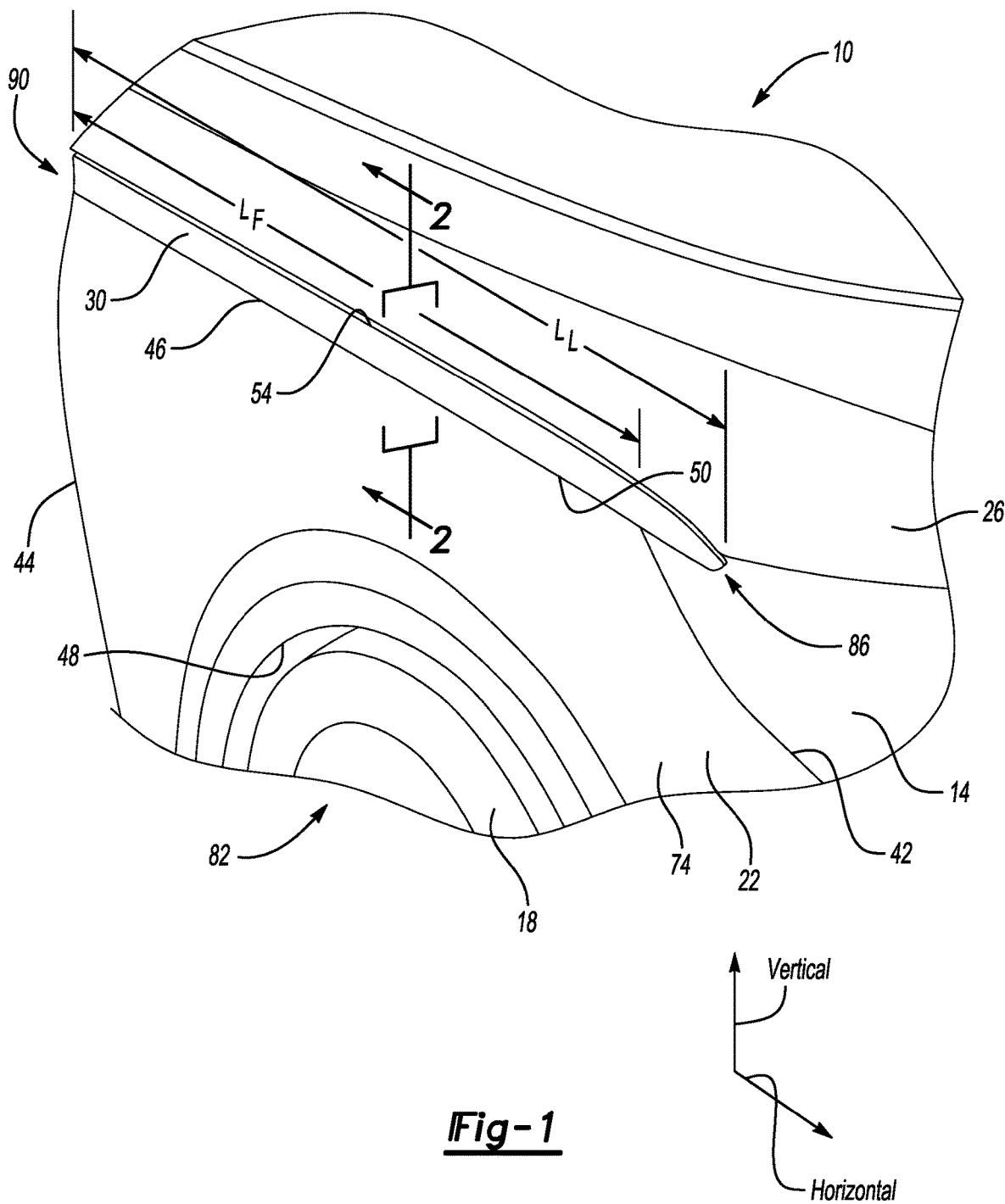
FIG. 1 illustrates a perspective view of a front passenger side corner area of a vehicle showing a lighting assembly according to an exemplary aspect of the present disclosure.

With reference to FIG. 1, a vehicle 10 includes a headlamp 14, a tire 18, a fender 22, a hood 26, and a lighting assembly 30 at an interface between the fender 22 and the hood 26.

The example fender 22 is a front fender of the vehicle 10. In another example, the fender could be a rear fender.

The example fender 22 and lighting assembly 30 are on a passenger side of the vehicle. The example vehicle 10 includes another front fender and lighting assembly on a driver side of the vehicle 10.

The fender 22 has a leading edge 42, a trailing edge 44, an upper edge 46, and a lower edge 48. Leading and trailing are with reference to an orientation of the vehicle 10. The leading edge 42 faces forward and is closer to a front of the vehicle 10 than the trailing edge 44. Upper and lower are with reference to ground. The upper edge 46 is a vertically upper edge, and the lower edge 48 is a vertically lower edge.

A vehicle lighting system includes the lighting assembly 30, which is disposed adjacent the upper edge 46 of the fender 22. A longitudinal length LL of the lighting assembly 30 is greater than a length LF of the upper edge 46 in this example.

The lighting assembly 30 has a lower side 50 and an upper side 52. The lower side 50 interfaces directly with the upper edge 46 of the fender 22.

Figure 2:
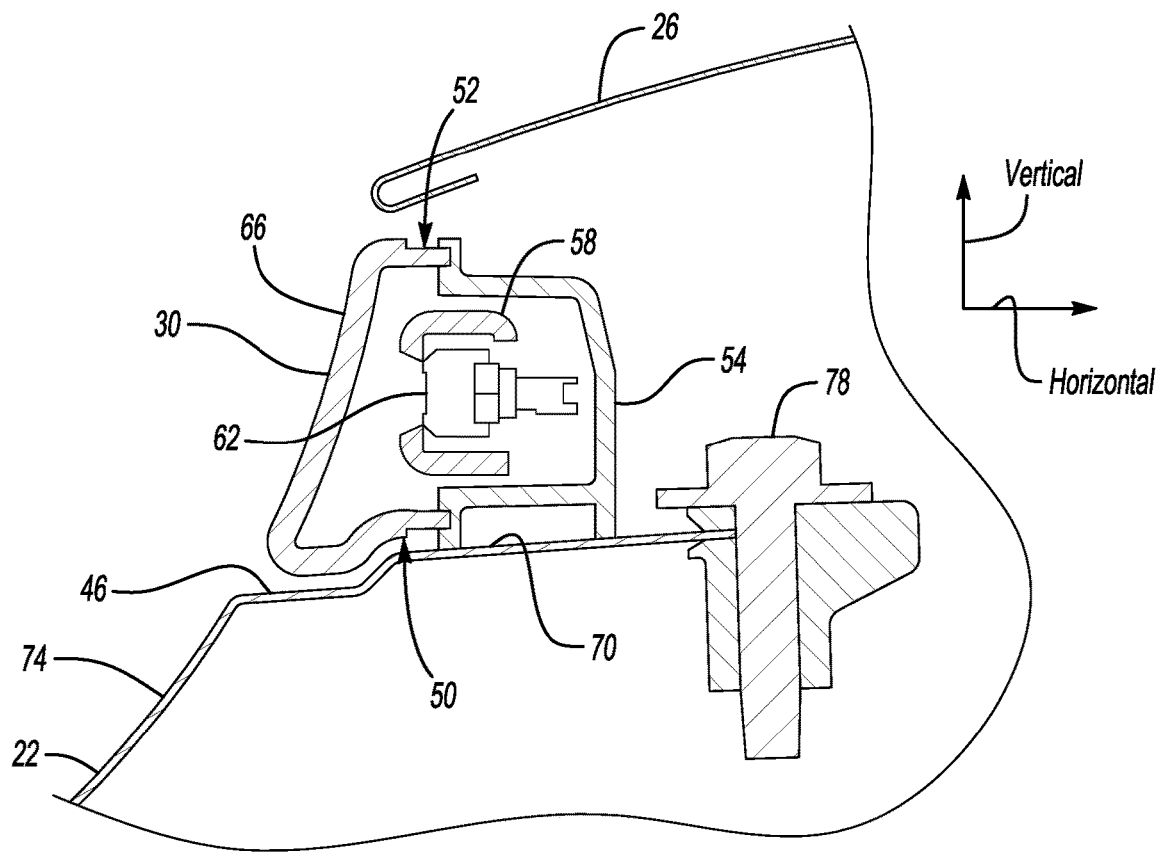
FIG. 2 illustrates a section view at line 2-2 in FIG. 1.
Figure 3:
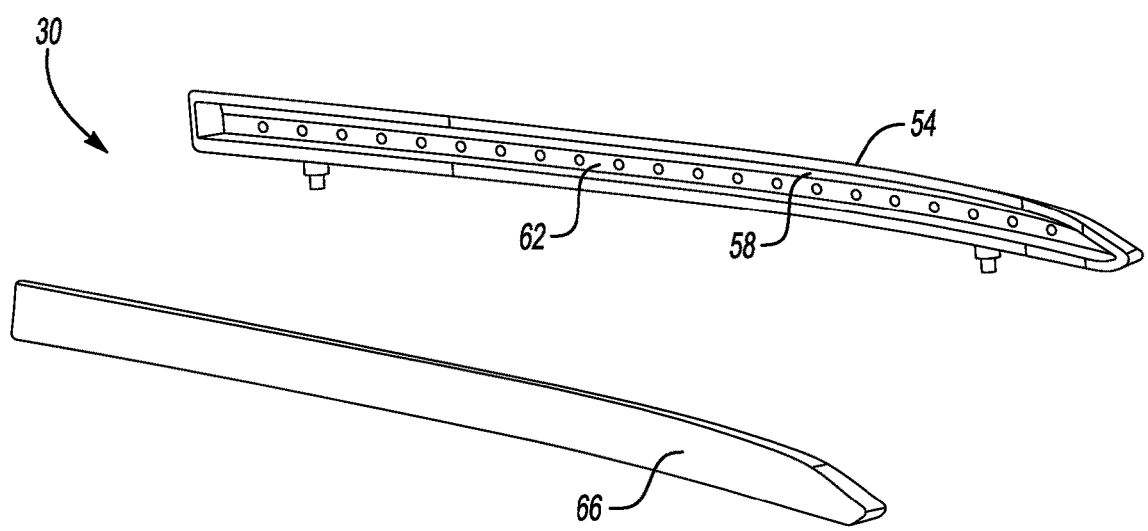
FIG. 3 illustrates an expanded view of the lighting assembly of claim FIG. 1.

With reference now to FIGS. 2 and 3 and continued reference to FIG. 1, the lighting assembly 30 includes a housing 54, a bracket 58, a light source 62, and a lens 66.

The lighting assembly 30 is mounted directly to the fender 22 in this example. The lighting assembly 30 is, in particular, mounted to a catwalk 70 of the fender 22. The catwalk 70 extends toward a centerline of the vehicle 10 away from a Class-A surface 74 of the fender 22. The catwalk 70 faces vertically upward in the example. Mechanical fasteners 78 can be used to secure the lighting assembly 30 to the catwalk.

The lighting assembly 30 extends from the leading edge 42 of the fender 22 to the trailing edge 44 of the fender 22. The lighting assembly 30 is directly adjacent the upper edge 46 of the fender 22 when installed. In this example, no portion of the fender 22 extends vertically above the fender 22.

The hood 26 is pivotable back and forth between the closed position shown and an open position. The lighting assembly 30 is disposed at the interface between the fender 22 and the hood 26 of the vehicle 10 when the hood 26 is in the closed position. When the hood 26 is in the closed position, the upper side 52 of the lighting assembly 30 is directly adjacent the hood 26 with no intervening structures between the hood 26 and the lighting assembly 30.

In this example, the fender 22 establishes at least a portion of a wheel well 82. The example lighting assembly 30 extends from a position that is aft the wheel well 82 to a position that is forward the wheel well 82.

The lighting assembly 30 extends longitudinally from a forward end 86 to a rear end 90 In this example, the forward end 86 of the lighting assembly 30 interfaces with the headlamp 14 on the passenger side of the vehicle 10. No portion of the fender 22 or hood 26 extends between the lighting assembly 30 and the headlamp 14.

In an example, the light source 62 is a strip of light emitting diodes (LEDs). In an example, the LEDs are RGB LEDs. The light source 62 could be ultra-violet charging LED strips in some example.

In the exemplary embodiment, a user of the vehicle can select colors emitted from the light source 62. The colors can be selected via a dialogue screen on an instrument panel of the vehicle 10, or by using a device other than the vehicle 10, such as a smartphone.

The light source 62 of the example lighting assembly 30 can be illuminated in different colors and different patterns. The light source 62 can be selectively illuminated to blink in an amber color and provide a supplemental amber turn indicator. When indicator lights for the vehicle 10 are needed and activated to alert individuals to a location of the vehicle 10, the light source 62 can blink in a yellow color to provide additional indicator lights.

When task lighting is required, the light source 62 can emit light in a white color. Task lighting from the lighting assembly 30 can help to illuminate an area for a user that is changing the tire 18, for example, and can help to alert other drivers on the road that the tire 18 is being changed.

When a user turns off the vehicle 10, the light source 62 can be illuminated in a soft white to provide a security feature. When a user locks the vehicle 10, the lighting assembly 30 can blink three times in a red color to confirm the locking. On the third blink, the red color can fade to off.

As a welcome feature, the light source 62 of the lighting assembly 30 can illuminate in a color chosen by the user in response to the user approaching the vehicle 10.

The lighting assembly 30 substantially emits light laterally outward away from a centerline of the vehicle 10.

A person having skill in this art and the benefit of this disclosure would understand how to configure a control system to control the lighting assembly 30 to emit light in a desired color and at a desired time.

Figure 4:
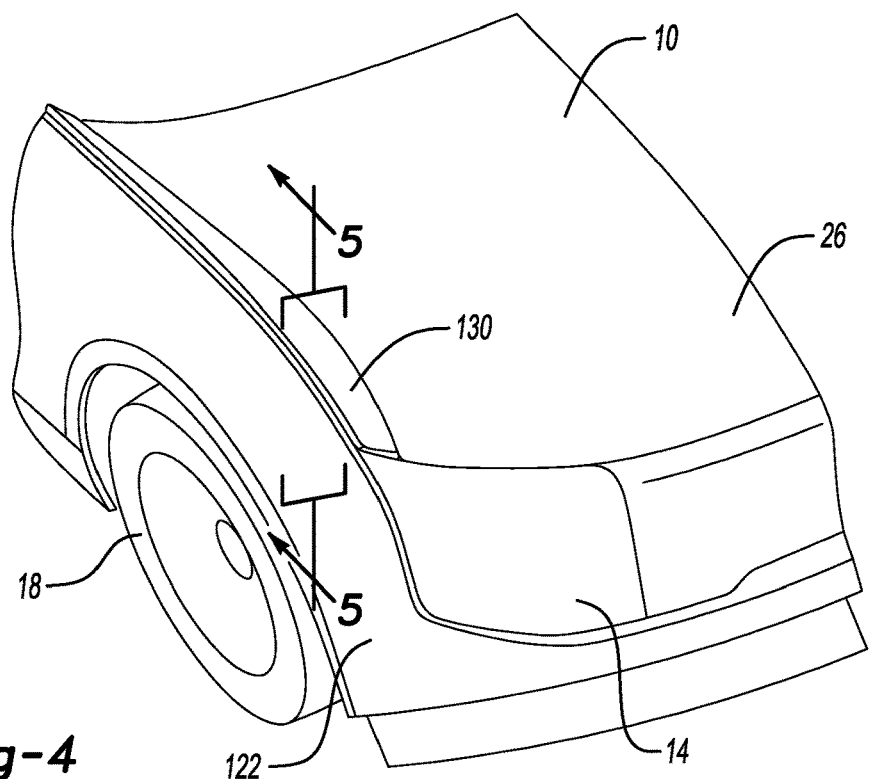
FIG. 4 illustrates a perspective view of a front passenger side corner area of a vehicle showing a lighting assembly according to another exemplary aspect of the present disclosure.
Figure 5:
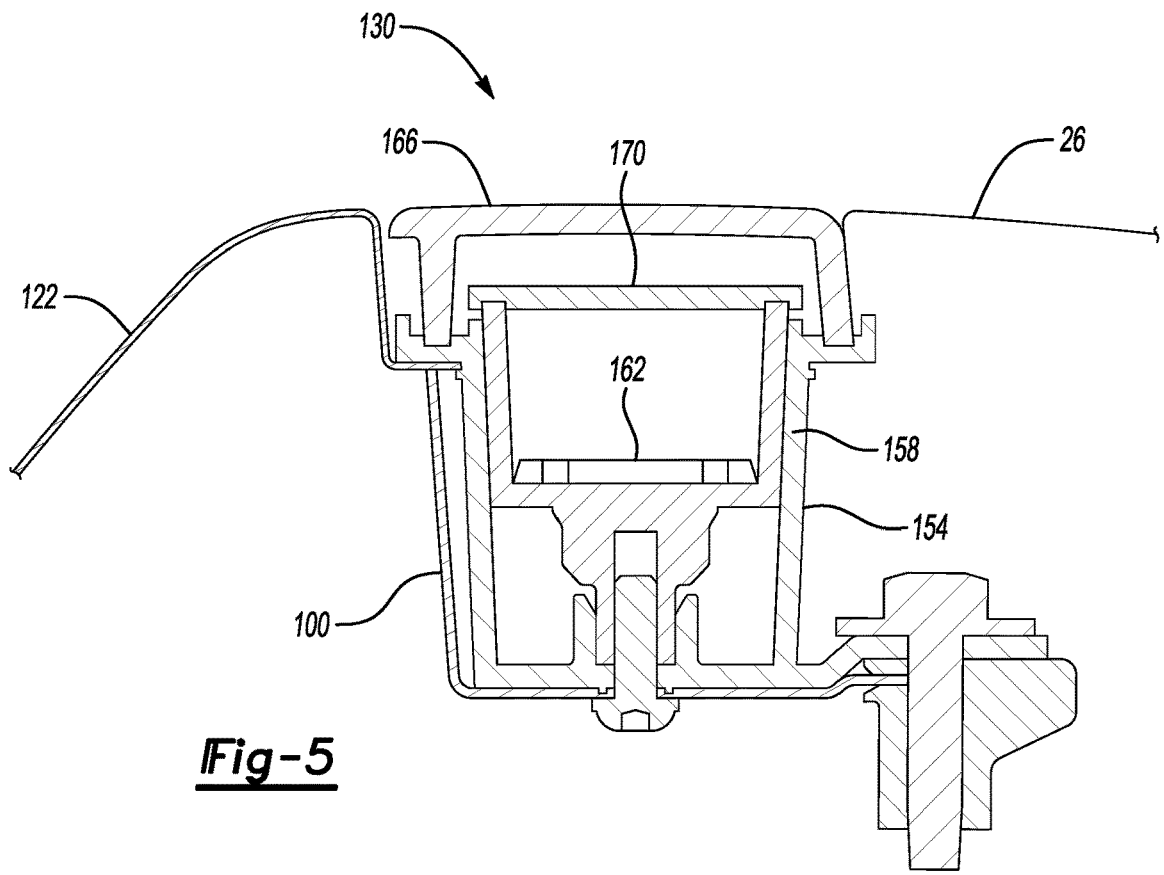
FIG. 5 illustrates a section view at line 5-5 in FIG. 4.

With reference to FIGS. 4 and 5, a lighting assembly 130 according to another exemplary embodiment faces substantially upward and emits light primarily vertically upward. Rather than mounting to a catwalk 70 of the fender 22 like the embodiment of FIGS. 1-3, the lighting assembly 130 is mounted to an extension 100 that is secured to a fender 122. The extension 100 can be welded to the fender 122, for example.

The example lighting assembly 130 includes a housing 154, a bracket 158, a light source 162, and an outer lens 166 and an inner lens 170. The light source 162 can be a flexible strip having LEDs. The example lighting assembly 130 does not include a reflector. The lighting assembly 130 could include a reflector in another example.

Like the lighting assembly 30, the lighting assembly 130 is disposed at an interface between the hood 26 and the fender 122 that establishes a wheel well. Like the lighting assembly 30, the lighting assembly 130 extends from a position that is aft the wheel well to a position that is forward the wheel well.

The lighting assembly 130 also extends from a leading edge of the fender 122 to a trailing edge of the fender. At a forward end, the lighting assembly 130 interfaces with the headlamp 14 on the passenger side of the vehicle 10.

Light emitted from the lighting assembly 130 could be collimated toward a front of the vehicle 10. The light can be refracted toward the front of the vehicle 10. Some of the light can be turned ninety degrees to avoid light entering the windshield area of the vehicle 10. In the embodiment of FIGS. 1-3, the light from the lighting assembly 30 can be collimated laterally outward away from the vehicle 10.

The intensity, colors, etc. of the light emitted from the lighting assembly 130 can be controlled similarly to the examples of how the light emitted from the lighting assembly 30 could be controlled.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:
1. A vehicle lighting system, comprising:
a fender; and
a lighting assembly that is disposed along an interface between a hood of a vehicle and a fender of the vehicle, the lighting assembly mounted to the fender, the lighting assembly mounted adjacent a vertically upper edge of the fender, wherein a longitudinal length of the lighting assembly is greater than a length of the vertically upper edge.

2. The vehicle lighting system of claim 1, wherein the lighting assembly is mounted to a catwalk of the fender, the catwalk facing vertically upward.

3. The vehicle lighting system of claim 1, wherein the lighting assembly extends from a leading edge of the fender to a trailing edge of the fender.

4. The vehicle lighting system of claim 1, wherein the fender is a front fender.

5. The vehicle lighting system of claim 1, wherein the fender establishes at least a portion of a wheel well.

6. The vehicle lighting system of claim 5, wherein the lighting assembly extends from a position aft the wheel well to a position forward the wheel well.

7. The vehicle lighting system of claim 1, wherein the lighting assembly includes a light source having an LED strip.

8. The vehicle lighting system of claim 1, wherein the lighting assembly includes a light source having ultra-violet charging LED strips.

9. The vehicle lighting system of claim 1, wherein no portion of the fender extends vertically above the lighting assembly.

10. The vehicle lighting system of claim 1, wherein a forward end of the lighting assembly interfaces directly with a headlamp of the vehicle.

11. A vehicle lighting method, comprising:
securing a lighting assembly at a position between a fender and a hood of a vehicle, the lighting assembly extending along a vertically upper end of the fender, the lighting assembly extending from a trailing edge of the fender to a leading edge of the fender; and
emitting light from the lighting assembly.

12. The vehicle lighting method of claim 11, wherein the lighting assembly extends to a position where the lighting assembly interfaces with a headlamp of the vehicle without a portion of the fender between the lighting assembly and the headlamp.

13. The vehicle lighting method of claim 11, wherein the lighting assembly extends from a position aft a wheel well to a position forward the wheel well, the fender providing the wheel well.

14. The vehicle lighting method of claim 11, further comprising blinking the light to provide a turn indicator.

15. The vehicle lighting method of claim 11, further comprising emitting light in different colors from the lighting assembly.

16. The vehicle lighting method of claim 11, further comprising collimating the light forward toward a front end of the vehicle.

17. A vehicle lighting system, comprising:
a fender having a vertically upper edge extending from a leading edge of the fender to a trailing edge of the fender, the leading edge meeting the vertically upper edge at a forward fender corner, the trailing edge meeting the vertically upper edge at a rear fender corner; and
a lighting assembly that is disposed along an interface between a hood of a vehicle and the fender of the vehicle, the lighting assembly mounted to the fender adjacent the vertically upper edge,
wherein a longitudinal length of the lighting assembly is greater than a length of the vertically upper edge,
wherein, the lighting assembly extending rearward from a position in front of the forward fender corner to the rear fender corner,
wherein the lighting assembly extends forward a wheel well and aft the wheel well,
wherein no portion of the fender extends vertically above the lighting assembly.

18. The vehicle lighting system of claim 17, wherein the lighting assembly is mounted to a catwalk of the fender, the catwalk facing vertically upward.

* * * * *